(12) United States Patent
Simon

(10) Patent No.: US 10,611,393 B1
(45) Date of Patent: Apr. 7, 2020

(54) OCCUPANT TRANSPORTATION ACCESSORY FOR LUGGAGE

(71) Applicant: Jacobo J. Simon, Orlando, FL (US)

(72) Inventor: Jacobo J. Simon, Orlando, FL (US)

( * ) Notice: Subject to any disclaimer, the term of this patent is extended or adjusted under 35 U.S.C. 154(b) by 104 days.

(21) Appl. No.: 15/708,877

(22) Filed: Sep. 19, 2017

Related U.S. Application Data

(60) Provisional application No. 62/396,342, filed on Sep. 19, 2016.

(51) Int. Cl.
*B62B 5/08* (2006.01)
*B62B 3/02* (2006.01)
*A45C 5/14* (2006.01)
*A45C 13/26* (2006.01)
*A45C 13/30* (2006.01)
*A45C 9/00* (2006.01)

(52) U.S. Cl.
CPC .............. *B62B 5/082* (2013.01); *A45C 5/14* (2013.01); *A45C 9/00* (2013.01); *A45C 13/262* (2013.01); *A45C 13/30* (2013.01); *B62B 3/02* (2013.01); *A45C 2009/002* (2013.01); *A45C 2013/267* (2013.01); *A45C 2013/306* (2013.01)

(58) Field of Classification Search
CPC . A47D 1/02; A47D 1/10; A47D 1/103; A47D 13/025; A47D 15/006; A45C 2009/002; B62B 5/08; B62B 5/082
See application file for complete search history.

(56) References Cited

U.S. PATENT DOCUMENTS

| | | | | |
|---|---|---|---|---|
| 3,366,294 A | * | 1/1968 | Stephenson | A47D 1/103 224/159 |
| 4,568,125 A | * | 2/1986 | Sckolnik | A47D 1/103 297/229 |
| 4,666,207 A | * | 5/1987 | Quartano | B62B 3/144 280/33.992 |
| 4,863,003 A | * | 9/1989 | Carter | A45C 9/00 190/8 |
| 5,499,860 A | * | 3/1996 | Smith | A47D 1/02 297/183.5 |
| 5,573,155 A | * | 11/1996 | Sadler | A45F 3/04 224/153 |
| 5,584,422 A | * | 12/1996 | Bond-Madsen | A45F 4/02 190/903 |
| 5,785,427 A | * | 7/1998 | Godshaw | A45F 4/02 383/4 |
| 5,819,999 A | * | 10/1998 | Tennant | A45F 4/02 224/155 |
| 5,868,463 A | * | 2/1999 | MacKenzie | A47C 7/021 297/228.12 |
| 6,206,471 B1 | * | 3/2001 | McGowan | B62B 3/144 297/219.12 |
| 6,241,313 B1 | * | 6/2001 | Lenz | A47D 1/10 297/188.06 |
| 6,244,481 B1 | * | 6/2001 | Brougher | A45F 4/02 224/153 |
| 6,616,242 B1 | * | 9/2003 | Stoll | B60N 2/265 297/250.1 |
| 6,755,198 B2 | | 6/2004 | Parker | |

(Continued)

*Primary Examiner* — Katy M Ebner
(74) *Attorney, Agent, or Firm* — Cramer Patent & Design, PLLC; Aaron R. Cramer

(57) ABSTRACT

An occupant transportation accessory for luggage involves a foldable planar padded seat having a pair of handles each oppositely secured near a bottom edge, a plurality of straps disposed upon a back surface, and an integrated restraint harness disposed upon a front surface.

12 Claims, 7 Drawing Sheets

(56) References Cited

U.S. PATENT DOCUMENTS

| | | | | |
|---|---|---|---|---|
| 6,848,746 B2* | 2/2005 | Gentry | A47C 7/748 | 297/180.11 |
| 6,863,350 B1* | 3/2005 | McCulley | B60N 2/2806 | 224/576 |
| 6,932,429 B2* | 8/2005 | Kamiki | B60N 2/2812 | 297/219.12 |
| 6,969,120 B2* | 11/2005 | Levin | A47D 1/02 | 297/250.1 |
| 7,000,985 B2* | 2/2006 | Belgarde | A47D 1/103 | 297/230.1 |
| 7,350,857 B2* | 4/2008 | Bishop | A45C 9/00 | 190/8 |
| 7,523,949 B1* | 4/2009 | Galfin | A45C 9/00 | 280/35 |
| 7,793,970 B2* | 9/2010 | Fegler | A45C 5/14 | 280/643 |
| 7,918,502 B2 | 4/2011 | Bacon | | |
| 8,152,236 B1* | 4/2012 | Romero | A47D 15/006 | 297/16.1 |
| 8,182,030 B1* | 5/2012 | Britten | A47D 13/025 | 297/118 |
| 8,316,490 B1 | 11/2012 | Bilak et al. | | |
| 8,517,462 B2* | 8/2013 | Birch | A01M 31/02 | 297/129 |
| 8,567,866 B2* | 10/2013 | Carimati Di Carimate | A47D 1/008 | 297/184.13 |
| 8,662,267 B1* | 3/2014 | Hart | A45C 5/14 | 190/1 |
| 9,526,350 B2* | 12/2016 | Kuusela | A45C 9/00 | |
| 9,596,939 B1* | 3/2017 | Helman | A47C 4/52 | |
| 9,730,526 B2* | 8/2017 | Brannstrom | A47D 13/02 | |
| 9,788,656 B2* | 10/2017 | Sanza Pilas | A47C 4/52 | |
| 9,808,097 B2* | 11/2017 | Whitt | A47C 1/16 | |
| 2004/0021353 A1* | 2/2004 | Lozano | A45C 13/00 | 297/255 |
| 2004/0066069 A1* | 4/2004 | Caldana | A45C 5/14 | 297/250.1 |
| 2004/0232756 A1* | 11/2004 | Lin | A47C 7/742 | 297/452.41 |
| 2010/0032460 A1* | 2/2010 | Hyde | A47D 1/103 | 224/160 |
| 2010/0072012 A1 | 3/2010 | Malinowski | | |
| 2010/0207435 A1* | 8/2010 | Vered | A47D 1/10 | 297/256.16 |
| 2012/0085609 A1 | 4/2012 | Ostrow et al. | | |
| 2012/0161408 A1* | 6/2012 | Sidhu | A45C 5/14 | 280/47.38 |
| 2014/0101859 A1* | 4/2014 | Testa | A47D 1/10 | 5/655 |
| 2015/0182028 A1* | 7/2015 | Thein | A47D 1/10 | 297/230.12 |
| 2017/0119117 A1* | 5/2017 | Clarke | A45C 5/14 | |
| 2017/0143084 A1* | 5/2017 | Ciraolo | A45C 13/262 | |
| 2018/0146794 A1* | 5/2018 | Torres | A47D 15/006 | |
| 2018/0279804 A1* | 10/2018 | Romero | A47D 15/006 | |

* cited by examiner

OCCUPANT TRANSPORTATION ACCESSORY FOR LUGGAGE

RELATED APPLICATIONS

The present invention is a continuation of and claims the benefit of U.S. Provisional Application No. 62/396,342 filed on Sep. 19, 2016, the entire disclosures of which are incorporated herein by reference.

FIELD OF THE INVENTION

The present invention relates generally to a seat accessory capable of removable attachment to portable luggage.

BACKGROUND OF THE INVENTION

When travelling, it is a burden to have to carry more than a few items while also using a portable piece of luggage. Also, particularly when travelling with young children, waling to gates in an airport or other similarly long walks, these young children tend to get tired and ask their parent or caregiver to also carry them. So now, not only does one have to pull their luggage but also have to carry their young ones.

Other ways of accomplishing this problem involves using a stroller as well as the portable luggage, but this creates the issue of having to steer two (2) items, which is cumbersome at best and impossible at worst. Further, the stroller can become tangled in the luggage. Some travelers at this stage will resort to placing the young one on the piece of luggage they are transporting, which is extremely dangerous to do so as they are not able to be properly secured on the luggage.

The use of the present invention enables travelers to easily secure their young one on the piece of luggage without the fear of them falling off or getting hurt, whole still being able to move freely. Parents and caregivers should travel stress-free; security check points are becoming too complicated and more involved and the fact of having one (1) less thing to be concerned about is a major benefit.

Various attempts have been made to solve problems found in automotive accessory art. Among these are found in: U.S. Pat. No. 8,182,030 to Britten; U.S. Pat. App. Pub. No. 2010/0072012 to Malinowski; U.S. Pat. App. Pub. No. 2004/0021353 to Lozano et al. and U.S. Pat. App. Pub. No. 2012/0161408 to Sidhu. These prior art references are representative of such occupant transportation accessories for a portable luggage item.

None of the above inventions and patents, taken either singly or in combination, is seen to describe the invention as claimed. Thus, a need exists for a reliable occupant transportation accessory capable of being attached to a portable luggage item, and to avoid the above-mentioned problems.

SUMMARY OF THE INVENTION

The inventor has recognized the aforementioned, inherent problems and lack in the art and observed that there is a need for a new and improved device for a portable luggage item incorporating a folding seat.

It is therefore an object of the invention to provide such a foldable seat including a seat bottom section, a pair of handles affixed to the seat bottom section, a seat back section hingedly connected to the seat bottom section, a seat belt assembly affixed to the foldable seat, and a securement strap system affixed to the foldable seat. The securement strap system is capable of retaining the foldable seat on the portable luggage item. The seat back section is capable of being supported by an extendable handle of the portable luggage item. The seat bottom section is capable of being supported by a top wall of the portable luggage system.

In an embodiment, the seat back section and the seat bottom section are co-attached with a living hinge.

In another embodiment, the seat back section is divided into at least two (2) sections. Preferably, each section is attached to an adjacent section with a living hinge.

In another embodiment, the seat belt assembly can utilize either a two-point strap suspension system, a three-point strap suspension system, a four-point strap suspension system, or a five-point strap suspension system.

In yet another embodiment, the securement strap system further includes at least one (1) strap system, each attached to a rear of said seat, and each comprising a pair of matable strap sections.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

DESCRIPTIVE KEY

Figure 1:
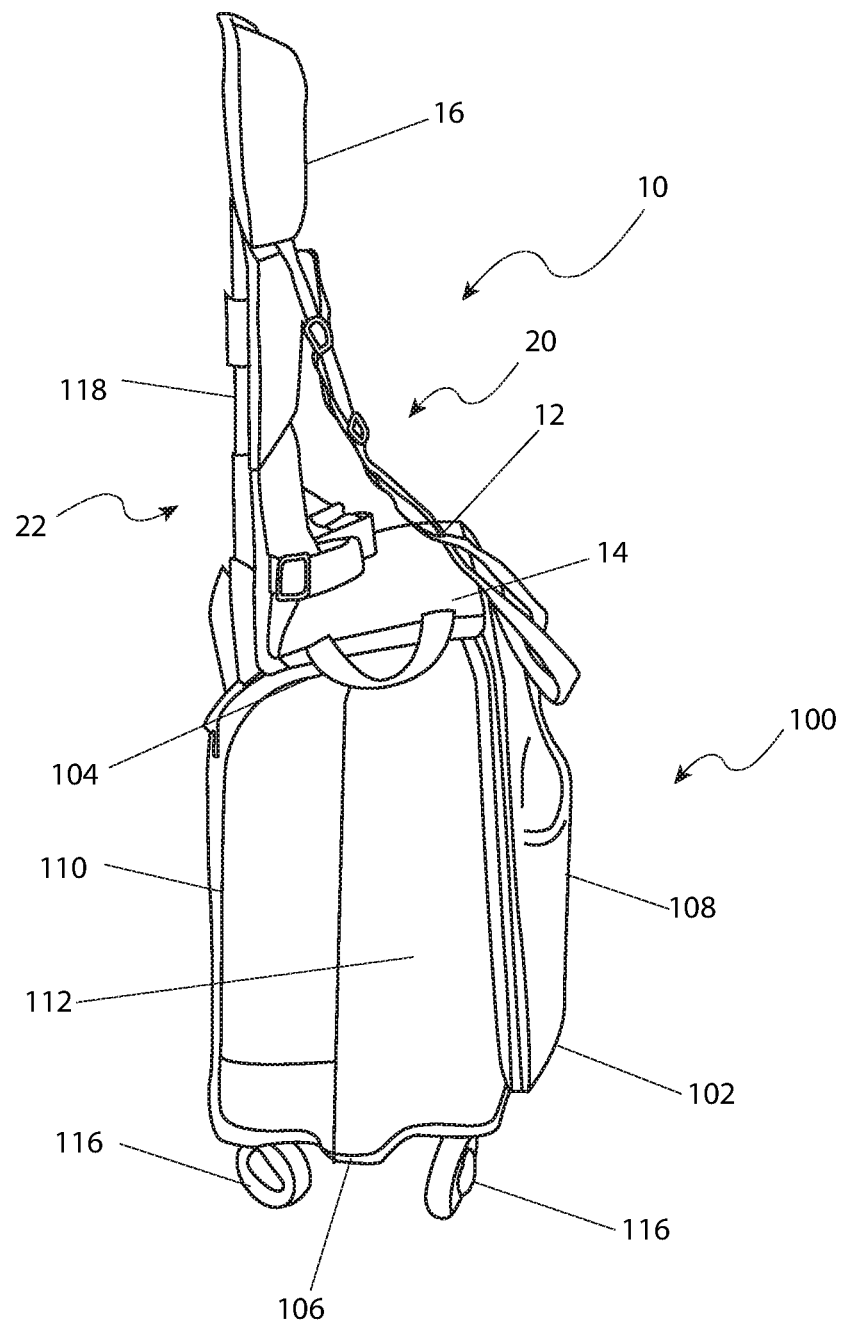
FIG. 1 is an environmental side perspective view of an embodiment of the disclosed foldable transportation seat attached to wheeled luggage.

10 foldable transportation seat for wheeled luggage
12 seat
14 seat bottom section
16 seat back section
16*a* seat back first section
16*b* seat back second section
16*c* seat back third section
18 first hinge
20 seat belt assembly
22 securement strap assembly 24 cover
26 core
28 second hinge
30 third hinge
32 left shoulder strap
34 right shoulder strap
36 waist strap
38 buckle
40 length adjuster
42 seat securement strap
44 fastener
46 handle
100 luggage
102 container body
104 top wall
106 bottom wall
108 front wall
110 rear wall
112 left side wall
114 right side wall
116 wheels
118 handle

DETAILED DESCRIPTION OF THE PREFERRED EMBODIMENT

Referring to FIGS. 1-7, disclosing a foldable transportation seat for wheeled luggage, herein generally referred to as an apparatus 10, where like reference numerals represent similar or like parts. Generally, the disclosed apparatus 10 is configured to engage a handle and a top wall of a luggage container so as to provide a comfortable, sturdy seat for a child to ride on, when attached to the luggage container.

Figure 2:
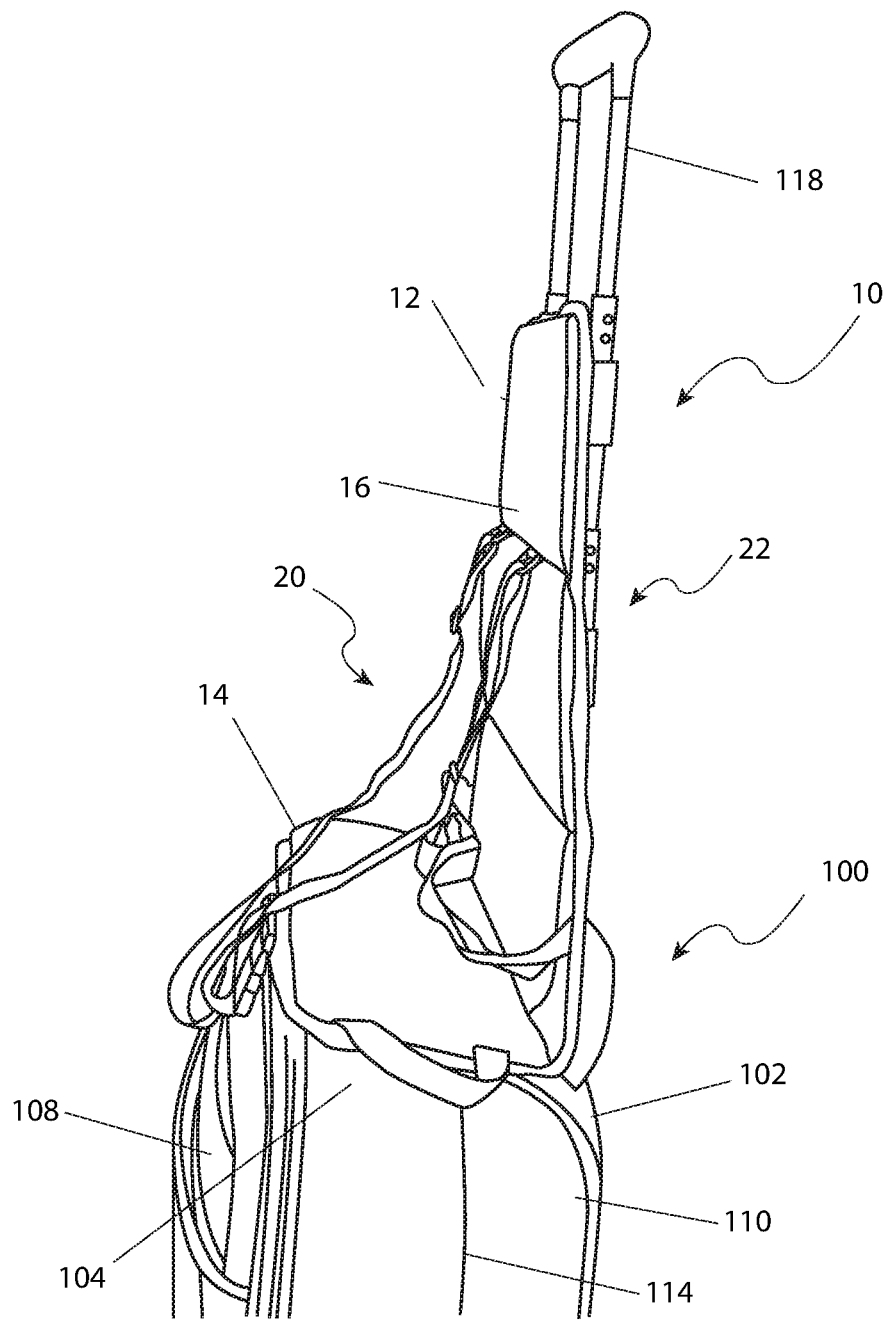
FIG. 2 is another environmental side perspective view of the disclosed foldable transportation seat attached to wheeled luggage.
Figure 3:
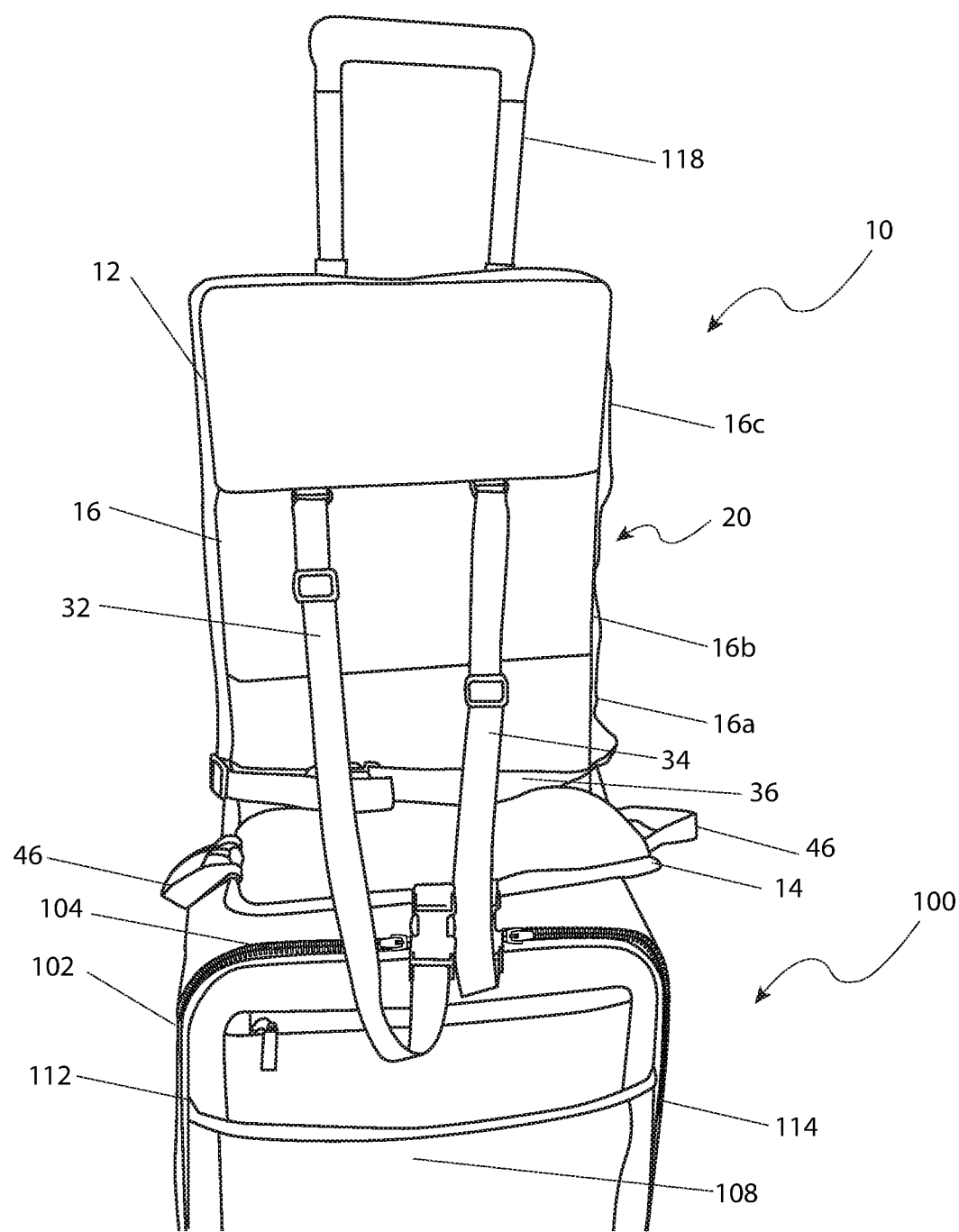
FIG. 3 is an environmental front perspective view of the disclosed foldable transportation seat attached to wheeled luggage.
Figure 4:
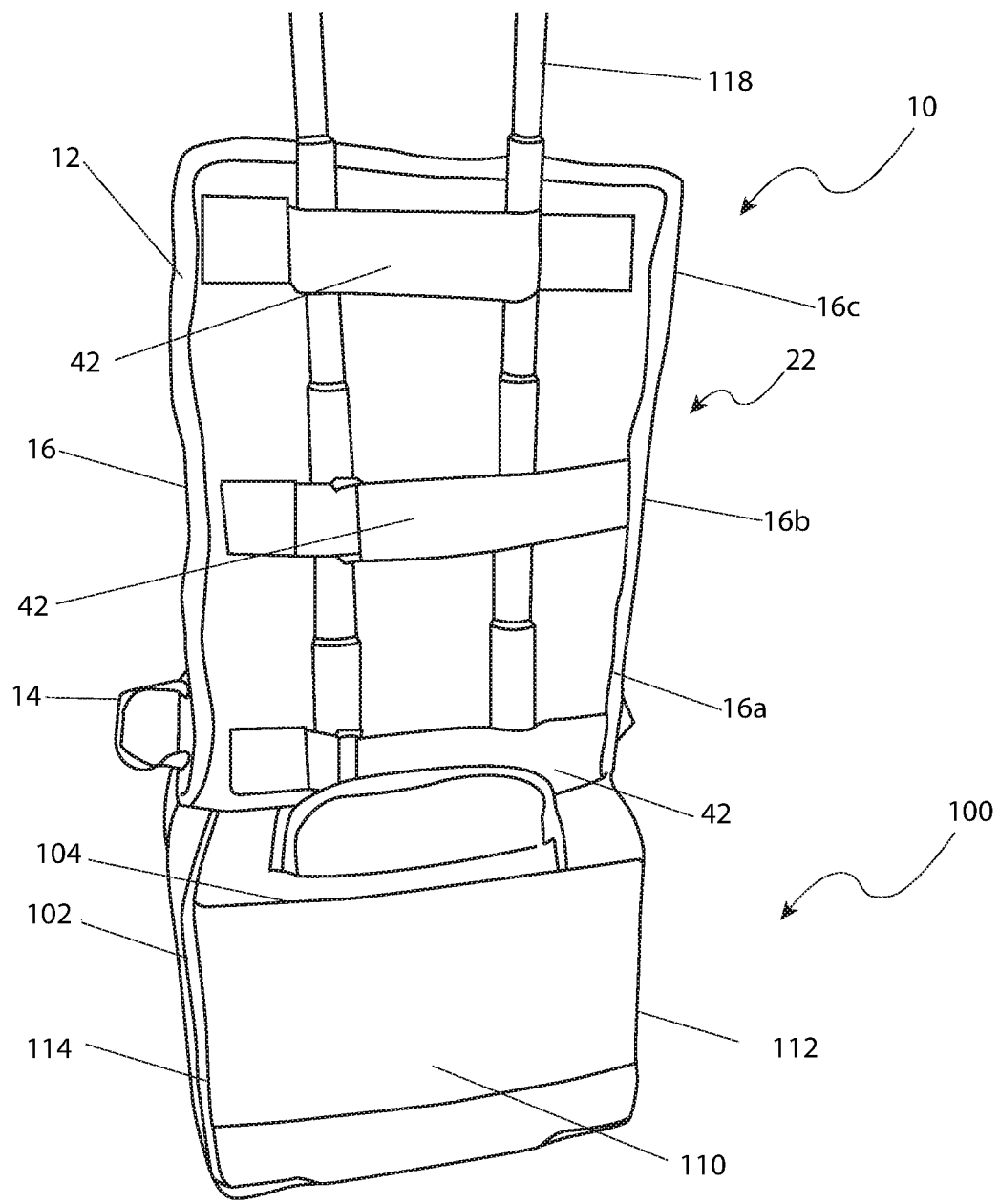
FIG. 4 is an environmental back perspective view of the disclosed foldable transportation seat attached to wheeled luggage.

FIG. 1 is a schematic illustration of an environmental first (e.g., left) side perspective view of the disclosed apparatus 10, according to an exemplary embodiment. FIG. 2 is a schematic illustration of an environmental second (e.g., right) side perspective view of the disclosed apparatus 10. FIG. 3 is a schematic illustration of an environmental front perspective view of the disclosed apparatus 10. FIG. 4 is a schematic illustration of an environmental rear perspective view of the disclosed apparatus 10. The apparatus 10 is configured to be attached to luggage 100. The luggage 100, also commonly referred to as baggage, includes any of bags, cases, containers and the like that hold a traveler's articles during transit.

Referring to FIGS. 1-4, the luggage 100 includes a stiff or rigid container body 102 formed from a top wall 104, a bottom wall 106, a front wall 108, a rear wall 110, a first (e.g., left) side wall 112 and a second (e.g., right) side wall 114 that define an interior compartment (not shown). The luggage 100 also includes two (2) or more wheels 116 connected to the bottom wall 106. The luggage 100 also includes a handle 118. Generally, the handle 118 is extendable from and retractable into the container body 102. As examples, the handle 118 may be connected to and extend from the rear wall 110, the top wall 104 or the like. The luggage 110 illustrated is merely representative of many similarly wheeled and handled luggage containers, having a number of different shapes and sizes and construction designs.

Figure 5:
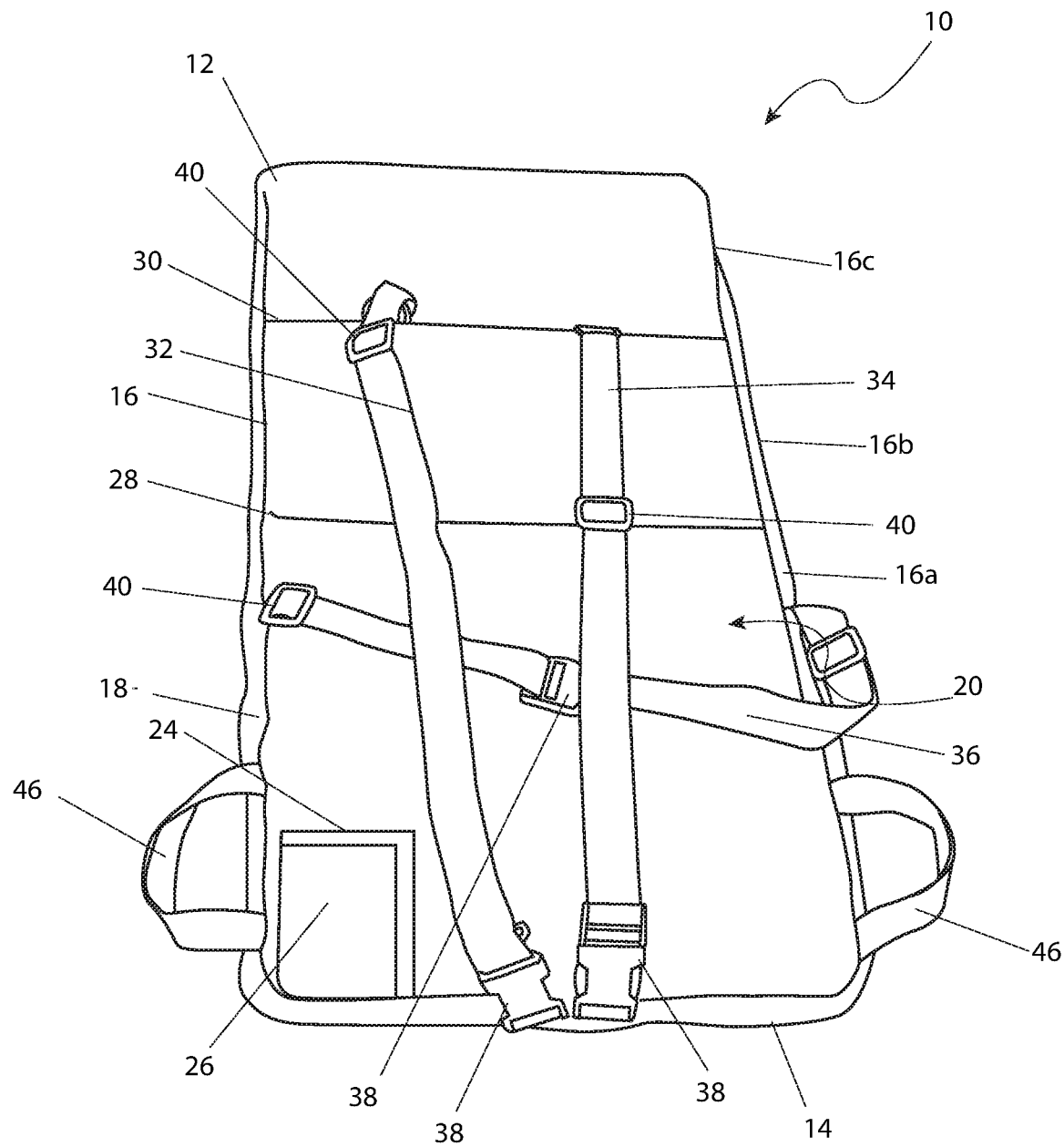
FIG. 5 is a front perspective view of the disclosed foldable transportation seat for wheeled luggage in an unfolded position.
Figure 6:
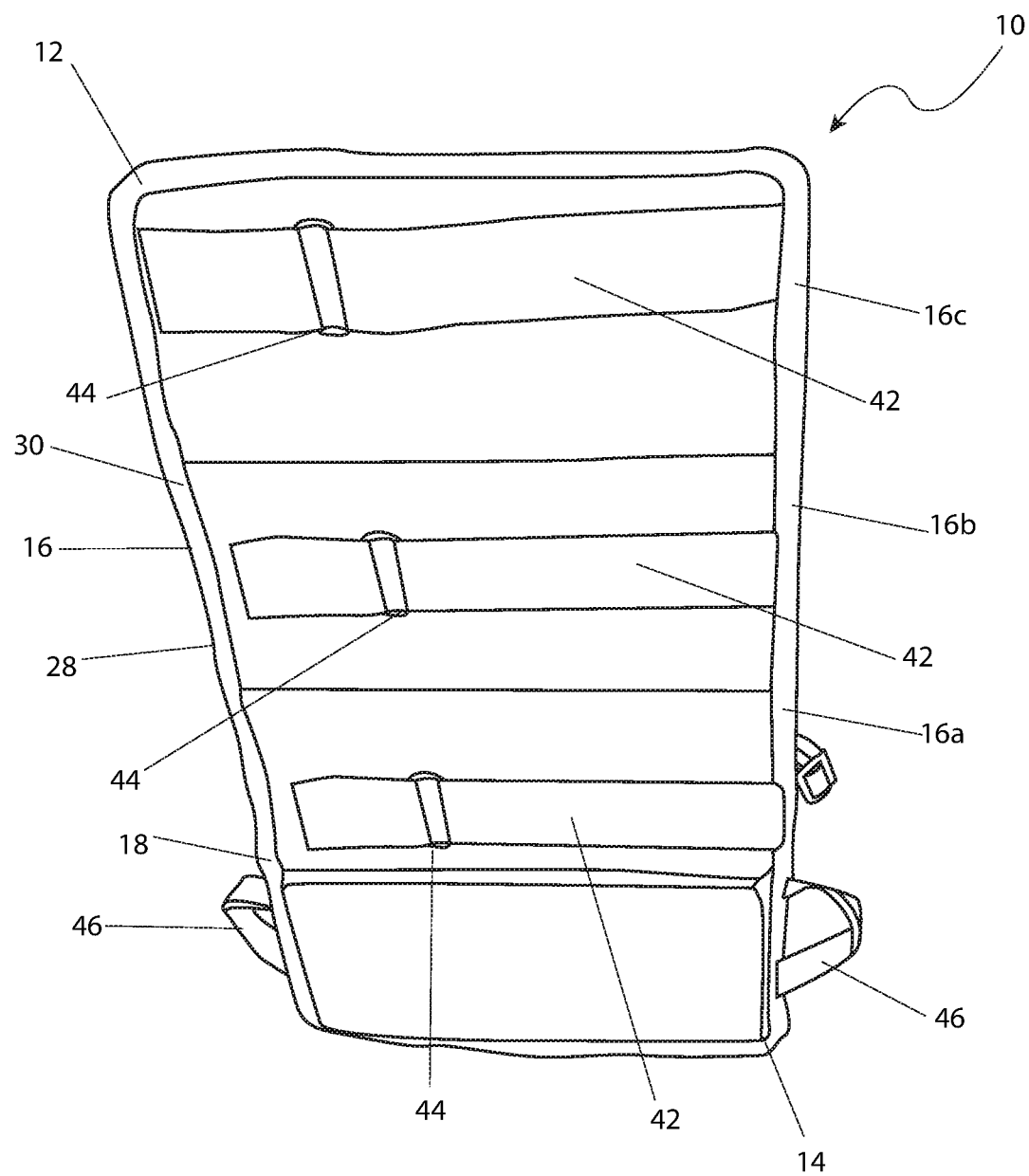
FIG. 6 is a rear perspective view of an embodiment of the disclosed foldable transportation seat for wheeled luggage in the unfolded position; and, FIG. 7 is side perspective view of the disclosed foldable transportation seat for wheeled luggage in a folded position.

FIG. 5 is a schematic illustration of a front perspective view of the apparatus 10 in an unfolded position, according to an exemplary embodiment. FIG. 6 is a schematic illustration of a rear perspective view of the apparatus 10 in the unfolded position. Generally, the apparatus 10 includes a seat 12. The seat 12 includes a seat bottom section 12 and a seat back section 14. The seat bottom section 14 is hingedly connected to the seat back section 16. As an example, the seat bottom section 14 and the seat back section 16 are hingedly connected along a first hinge 18.

The first hinge 18 may be any suitable hinge mechanism or device, for example, depending upon the materials of construction and manufacturing techniques used to make the apparatus 10. As an example, the first hinge 18 may be a living hinge, for example, in the form of a thin flexible hinge made from the same material as the seat bottom section 14 and the seat back section 16. This may be accomplished by attaching the seat bottom section 14 and the seat back section 16 along adjacent edges with a portion of fabric, such as the fabric forming the fabric cover 24 of the seat 12.

The hinged connection between the seat bottom section 14 and the seat back section 16 allows the two (2) sections to be able to lay in the unfolded position as illustrated in FIGS. 5 and 6. The hinged connection between the seat bottom section 14 and the seat back section 16 also allows the two (2) sections to be able to lay in a partially folded or open position perpendicular to one another, as illustrated in FIGS. 1-4. In other words, when connected to the luggage 100, as illustrated in FIGS. 1-4, the seat bottom section 14 and the seat back section 16 form an "L"-shaped seat 12 for connection to the luggage 100.

Referring still to FIGS. 5 and 6, the seat back section 16 of the seat 12 may be divided into two (2) or more sections. In the illustrative example, the seat back section 16 includes three (3) sections, identified herein as a seat back-first section 16a, a seat back-second section 16b and a seat back-third section 16c. In this embodiment, when the seat 12 is connected to the luggage 100, the seat bottom section 14 provides support to the buttocks and upper legs of the child, the seat back-first section 16a provides support to the lower back of the child, the seat back-second section 16b provides support to the upper back of the child and the seat back-third portion provides support to the head of the child. While three (3) sections of the seat back section 16 are shown in the embodiment illustrated in FIGS. 5 and 6, in other embodiments, the seat back section 16 may have more (e.g., four (4) or more) or less (e.g., one (1) or two (2)) sections.

The seat back first section 16a is hingedly connected to the seat bottom section 14, for example, at or along the first hinge 18. The seat back second section 16b is hingedly connected to the seat back-first section 16a, for example, at or along a second hinge 28. The seat back third section 16c is hingedly connected to the seat back-second section 16b, for example, at or along a third hinge 30.

Figure 7:
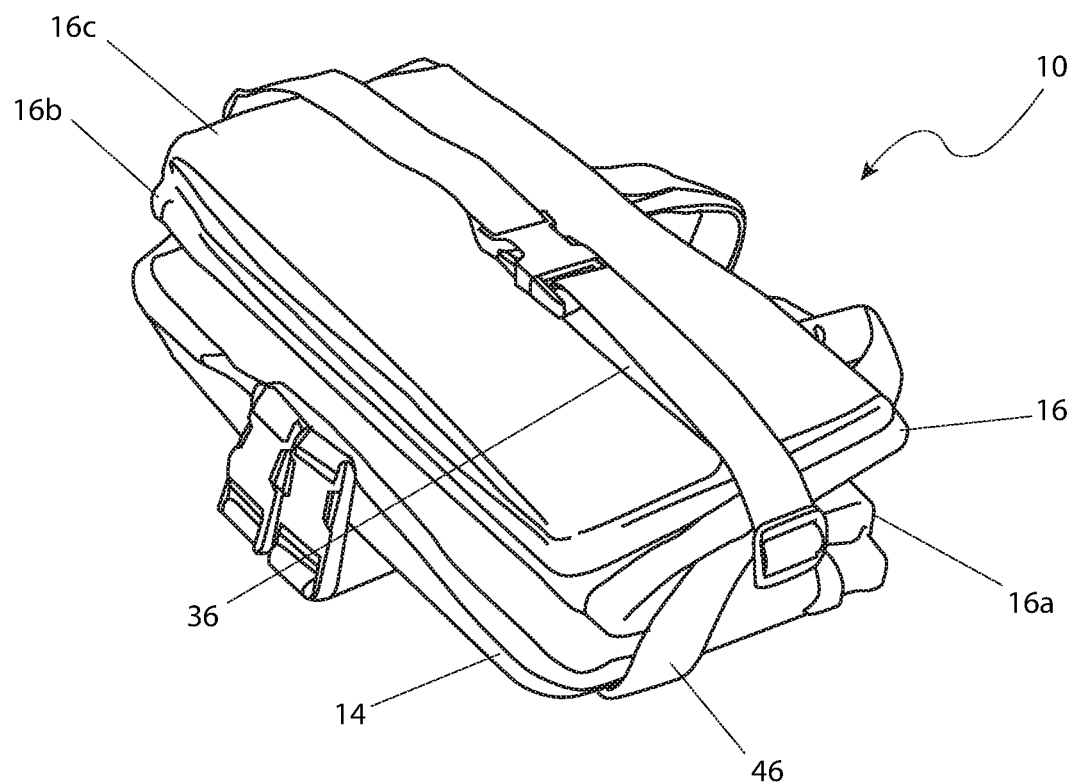

Like the first hinge 18, the second hinge 28 and/or the third hinge 30 may be any suitable hinge mechanism or device, for example, depending upon the materials of construction and manufacturing techniques used to make the apparatus 10. As an example, the second hinge 28 and/or the third hinge 30 may be a living hinge, for example, in the form of a thin flexible hinge made from the same material as the sections of the seat 12. This may be accomplished by attaching each section along adjacent edges with a portion of fabric, such as the fabric forming the fabric cover 24 of the seat 12. The folding sections permit the seat 12 to be folded into a more compact configuration when not in use e.g. for ease of transport, storage, etc., as illustrated in FIG. 7.

Referring to FIG. 5, the apparatus 10 also includes a seat belt assembly 20 that enables a child to be secured in the seat 12. The seat belt assembly 20 may include a plurality of straps. In various embodiments, the seat belt assembly 20 may provide for a two-, three-, four-, or five-point strap suspension system. The particular configuration of the straps of the seat belt assembly 20 may vary depending upon the construction of the seat 12. In the illustrative embodiment, the seat belt assembly 20 provides a three-point suspension system that includes a first (e.g., left) shoulder strap 32, a second (e.g., right) shoulder strap 34 and a waist strap (or lap belt) 36. In other embodiments, the seat belt assembly 20 may also include a chest strap and/or an anti-submarine strap, which would define a five-point strap system. In the illustrative embodiment, the left shoulder strap 32 and the right shoulder strap 34 also serve as anti-submarine straps.

In an example construction, the left shoulder strap 32 and the right shoulder strap 34 are connected about the front side of the seat 12. An upper end of each of the left shoulder strap 32 and the right shoulder strap 34 may be connected to the seat back section 16 at approximately a shoulder level of the child passenger. The upper ends of each of the left shoulder strap 32 and the right shoulder strap 34 are spaced apart a suitable distance to accommodate a child's head therebetween. As an example, the upper ends of the left shoulder strap 32 and the right shoulder strap 34 are connected at the third hinge 30 defined between the seat back-second section 16b and the seat back third section 16c. A lower end of each of the left shoulder strap 32 and the right shoulder strap 34 may be connected to a lower perimeter edge of the seat bottom section 14. In the illustrative embodiment, the lower ends of the left shoulder strap 32 and the right shoulder strap 34 converge and are connected to an approximately central location on the lower perimeter edge of the seat bottom section 14, in such a manner, the left shoulder strap 32 and the right shoulder strap 34 also serve as the anti-submarine strap positioned between the legs of the child.

Similarly, the waist strap 36 is connected about the front side of the seat 12. The waist strap 36 may be connected to the seat back section 16 at approximately waist level of the child passenger. A left end of the waist strap 36 is connected to a left perimeter edge of the seat back section 16 and a right end of the waist strap 36 is connected to a right perimeter edge of the seat back section 16. As an example, the ends of the waist strap 36 may be connected to opposing perimeter edges of the seat back-first section 16a.

In an example construction, each one (1) of the left shoulder strap 32 and the right shoulder strap 34 includes a cooperating pair of strap-sections that are engageable and connected to one (1) another, for example, at a buckle 38. As an example, an end of a first (e.g., upper) strap-section of the left shoulder strap 32 and the right shoulder strap 34 are connected to the seat back section 16 at approximately a shoulder level of the child passenger, for example, at the third hinge 30 defined between the seat back second section 16b and the seat back-third section 16c. An end of a second (e.g., lower) strap-section of the left shoulder strap 32 and the right shoulder strap 34 are connected to the seat bottom section 14, for example, at the approximately central location on the lower perimeter edge of the seat bottom section 14. Cooperating ends of the upper strap-section and the lower strap-section of the left shoulder strap 32 and the right shoulder strap 34 are connected at the buckle 38.

Similarly, in an example construction, the waist strap 36 includes a cooperating pair of strap-sections that are engageable and connected at a buckle 38. As an example, an end of a first (e.g., left) strap-section is connected to the seat back section 16, for example, to the left perimeter edge of the seat back first section 16a. An end of a second (e.g., right) strap-section is connected to the seat back section 16, for example to the right perimeter edge of the seat back first section 16a. Cooperating ends of the left strap-section and the right strap-section of the waist strap 36 are connected at the buckle 38.

The buckles 38 may be of any suitable type of engageable and releasable buckle mechanism or clasp device and the particular configuration or design of the buckles 38 of the seat belt assembly 20 may vary. As a specific example, one (1) or more of the buckles 38 may be side release or quick release type buckles. As other specific examples, one (1) or more of the buckles 38 may be cam and spring lock buckles, ratchet buckles, slide and loop strap adjusters and the like or a combination thereof. One (1) or more of the buckles 38 may also include a length adjustment mechanism, such as a tri-glide, integrated as part of the buckle 38.

In an example construction, one (1) or more of the left shoulder strap 32, the right shoulder strap 34 and/or the waist strap 36 include a length adjuster 40. The length adjuster 40 may be connected to one (1) or more strap-sections of the left shoulder strap 32, the right shoulder strap 34 and/or the waist strap 36 to provide for length adjustment of the same. The length adjuster 40 may be of any suitable type of length adjustment mechanism or device and the particular configuration or design of the length adjusters 40 of the seat belt assembly 20 may vary. As a specific example, one (1) or more of the length adjusters 40 may be a tri-glide through which the strap-section is wound.

Referring to FIG. 6, the apparatus 10 also includes a securement strap assembly 22 that enables the seat 12 to be securely connected to the luggage 100. In various embodiments, the securement strap assembly 22 provides for multiple points of attachment to the luggage 100. The particular configuration of the straps of the securement strap assembly 22 may vary depending upon the construction of the seat 12. The securement strap assembly 22 includes a plurality of seat securement straps 42. In the illustrated embodiment, the securement strap assembly 22 includes three seat securement straps 42. In other embodiments, the securement strap assembly 22 may include more or less seat securement straps 42.

In an example construction, each one (1) of the seat securement straps 42 are connected about the rear side of the seat 12. For example, the seat securement straps 42 are connected about the rear surface of the seat back section 16. A first (e.g., left) end of each seat securement strap 42 may be connected to the seat back section 16 at or near the left perimeter edge of the seat back section 16. A second (e.g., right) end of each seat securement strap 42 may be connected to the seat back section 16 at or near the right perimeter edge of the seat back section 16. In the illustrated embodiment, each one (1) of the seat back first section 16a, the seat back second section 16b and the seat back third section 16c have an associated one (1) of the seat securement straps 42. The seat securement strap 42 may span across the rear side of each associated section of the seat back section 16. However, in other embodiments, one (1) or more of the seat back first section 16a, the seat back second section 16b and the seat back third section 16c may include more or less seat securement straps 42.

In an example construction, each one (1) of the seat securement straps 42 includes a cooperating pair of strap-sections that are engageable and connected to one (1) another, for example, at a fastener 44. As an example, an end of a first (e.g., left) strap-section of one (1) (e.g., a first) seat securement strap 42 is connected to the seat back section 16, for example, at the left perimeter edge of the seat back-first section 16a and an end of a second (e.g., right) strap-section of the first seat securement strap 42 is connected to the seat back section 16, for example, at the right perimeter edge of the seat back-first section 16*a*. Similarly, an end of a first (e.g., left) strap-section of another one (1) (e.g., a second) seat securement strap 42 is connected to the seat back section 16, for example, at the left perimeter edge of the seat back second section 16*b* and an end of a second (e.g., right) strap-section of the second seat securement strap 42 is connected to the seat back section 16, for example, at the right perimeter edge of the seat back second section 16*b*. Similarly, an end of a first (e.g., left) strap-section of yet another one (1) (e.g., a third) seat securement strap 42 is connected to the seat back section 16, for example, at the left perimeter edge of the seat back-third section 16*c* and an end of a second (e.g., right) strap-section of the third seat securement strap 42 is connected to the seat back section 16, for example, at the right perimeter edge of the seat back-third section 16*b*. Cooperating ends of the left strap-section and the right strap-section of the seat securement strap 42 are connected at the fastener 44.

The fasteners 44 may be of any suitable type engageable and releasable fastening mechanism or device and the particular configuration or design of the fasteners 44 of the seat securement strap assembly 22 may vary. As a specific example, one (1) or more of the fasteners 44 may be a hook and loop D-ring strap fastener that allows for the cooperating ends of the strap-sections of the seat securement strap 42 to be connected together and for length adjustment of the seat securement strap 42. As other specific examples, the fasteners 44 may be ratchet buckles, cam and spring lock buckles, slide and loop strap adjusters and the like or a combination thereof.

Referring to FIGS. 1-4, in an example implementation of use, the seat 12 engages and is connected to the luggage 100. The seat bottom section 14 engages and is supported by the top wall 104 of the container body 102 of the luggage 100. The seat back section 16 engages and is supported by the handle 118 of the luggage 100 when in the extended position. With the seat 12 placed in the open position with the seat bottom section 14 extending perpendicular to the seat back section 16, the combination of seat back section 16 and the seat bottom section 14 provides support to the back and buttocks and legs of a child when the child is seated in the apparatus 10 and the apparatus 10 is engaged to the luggage 100 so as to ride on the wheels 116 when tilted.

In the illustrated embodiment, when the apparatus 10 is connected to the luggage 100, the seat bottom portion 14 engages and is supported by the top wall 104 of the container body 102. The seat back first section 16*a*, the seat back second portion 16*b* and the seat back third portion 16*c* engage and are supported by the extended handle 118 of the luggage 100. The seat securement straps 42 of the securement strap assembly 22 are positioned and tightened around the handle 118 to secure the seat 12 to the luggage 100.

The overall size of the seat 12 may vary depending, for example, on the size of the child passenger, the type and/or size of the luggage 100 and the like. For example, the seat 12 may be as wide or as narrow as desired to that the apparatus 10 can be properly connected to the luggage 100 and comfortably seat the child passenger.

FIG. 7 is a schematic illustration of a perspective side view of the apparatus 10 in a folded position, according to an exemplary embodiment. The seat bottom section 14, the seat back first section 16*a*, the seat back second section 16*b* and the seat back third section 16*c* may be folded to a closed or folded position. As an example, the seat back-first section 16*a* may be folded over top of the seat bottom section 14, the seat back second section 16*b* may be folded over top of the seat back-first section 16*a* and the seat back third section 16*c* may be folded over top of the seat back second section 16*b*. In other words, the sections of the seat 12 may be folded as an accordion fold to be placed in the closed or completely folded position. In this embodiment, each one of the sections of the seat 12, for example, the seat bottom section 14, the seat back first section 16*a*, the seat back second section 16*b* and the seat back third section 16*c*, have substantially the same size and shape (e.g., perimeter dimensions).

Referring to FIGS. 5-7, the apparatus 10 also include a pair of handles 46. In an example construction, a respective one (1) (e.g., a right and a left) handle 46 is connected to opposing (e.g., right and left) perimeter edges of the seat bottom section 14.

When accordion folded into the closed or completely folded position, the waist strap 36 may be wrapped around the folded sections of the seat 12, passed through the opposing handles 46 and connected together to secure the folded sections of the seat 12 in the closed position.

Referring to FIG. 5, one (1) or more sections of the seat 12, for example, the seat bottom section 14 and/or the seat back section 16 including the seat back-first section 16*a*, the seat back second section 16*b* and/or the seat back third section 16*c*, may be made from a padded core 26 enclosed within the fabric cover 24. FIG. 5 illustrates a portion of the lower left corner of the cover 24 of the seat 12 (e.g., of the seat bottom section 14) cutaway to expose the interior padded core 26.

As an example, each section of the seat 12 may be formed by the padded core 26. The fabric cover 24 may enclose the individual sections of the padded core 26 defining the section of the seat 12. The fabric cover 24 may be connected (e.g., sewn) along an entire perimeter edge of the seat 12. The hinges, for example, one (1) or more of the first hinge 18, the second hinge 28 and/or the third hinge 30, may be formed by connected (e.g., sewing) front and rear sides of the cover 26 together between the sections of the padded core 26, which also forms or defines the individual sections of the seat 12. Thus, seams formed in the cover 26 physically separate adjacent ones of the sections of the padded core 26 to define the seat bottom section 14, the seat back first section 16*a*, the seat back second section 16*b* and the seat back third section 16*c*.

The fabric cover 24 may be made of any desirable material or materials. In an example construction, the cover 24 is made of a synthetic, non-synthetic or blended fabric material. The exterior front side of the cover 24 may be made of a material impermeable to liquids such as vinyl, rubber, etc. to protect the seat 12 from liquids on the outer surface. Optionally, the front side of the cover 24 may have a roughened, bumpy, or otherwise high-friction surface to increase the surface friction between the child and the seat 12 so that the child does not slide off the seat 12 during use, for example, while securing the seat belt strap assembly 20.

One (1) or more of the left shoulder strap, the right shoulder strap, the waist strap and/or the seat securement straps 42 may be made of a non-elastic material, semi-elastic material, elastic material or any other type of material. One (1) or more of the straps may be wide or narrow depending upon the size and shape of the associated buckle 38 or fastener 44. Some or all of the straps may be directly attached to seat 12, generally, or the cover 24, specifically, for example, no additional fastening or retaining mechanism is used for fixing the strap to the cover 24. Alternatively, some of all of the straps may be connected to a fastening or retaining mechanism, for example, a D-ring, attached directly to the seat 12, generally, or the cover 24, specifically.

The sections of the padded core 26 provides cushioned support for the child passenger. As examples, the padded core 26 may be made of foam, rubber and the like or some combination thereof. Optionally, the padded core 26 may also include a relatively rigid material, such as plastic, to provide structural support to the sections of the seat 12.

Spatially relative terms such as "under," "below", "lower", "over", "upper", "left", "right", "front", "rear", and the like, are used for ease of description to explain the positioning of one (1) element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplate

The invention claimed is:

1. A foldable seat capable of being attached to a portable luggage item, comprising:
a seat bottom section;
a pair of handles affixed to opposing perimeter edges of said seat bottom section to facilitate grasping said seat bottom section, when said foldable seat is accordion folded into a closed position or a completely folded position;
a seat back section hingedly connected to the seat bottom section;
a seat belt assembly affixed to said foldable seat, capable of restraining an occupant thereon; and,
a securement strap system affixed to said foldable seat, capable of retaining said foldable seat on said portable luggage item, said securement strap is wrapped around said folded sections of said foldable seat and passed through said opposing pair of handles and connected together to secure said folded sections of said foldable seat in said closed position;
wherein said seat back section is capable of being supported by an extendable handle of said portable luggage item;
wherein said seat bottom section is capable of being supported by a top wall of said portable luggage item;
wherein said seat bottom section and said seat back section are co-attached with a living hinge;
wherein said seat back section is divided in at least two sections, each section hingedly attached to an adjacent section;
wherein said seat back section further comprises:
a seat back first section, having a first end hingedly attached to said seat bottom section;
a seat back second section, having a first end hingedly attached to a second end of said seat back first section;
a seat back third section, having a first end hingedly attached to a second end of said seat back second section;

wherein:
said seat bottom section and said seat back first section are co-attached with a first living hinge;
said seat back second section and said seat back first section are co-attached with a second living hinge; and,
said seat back second section and said seat back third section are co-attached with a third living hinge.

2. The foldable seat of claim 1, wherein said seat belt assembly further comprises a two-point strap suspension system.

3. The foldable seat of claim 1, wherein said seat belt assembly further comprises a three-point strap suspension system.

4. The foldable seat of claim 1, wherein said seat belt assembly further comprises a four-point strap suspension system.

5. The foldable seat of claim 1, wherein said seat belt assembly further comprises a five-point strap suspension system.

6. The foldable seat of claim 1, wherein said securement strap system further comprises at least one strap system, each attached to a rear of said seat, and each comprising a pair of matable strap sections.

7. A portable luggage item, comprising:
a container body, comprising:
a top wall, a bottom wall, a front wall, a rear wall, a first side wall, a second side wall, and defining an interior compartment;
at least two wheels attached to said bottom wall; and,
a handle capable of being extended from and retracted within said interior compartment; and,
a foldable seat, comprising:
a seat bottom section;
a pair of handles affixed to opposing perimeter edges of said seat bottom section to facilitate grasping said seat bottom section, when said foldable seat is accordion folded into a closed position or a completely folded position;
a seat back section hingedly connected to the seat bottom section;
a seat belt assembly affixed to said foldable seat, capable of restraining an occupant thereon; and,
a securement strap system affixed to said foldable seat, capable of retaining said foldable seat on said portable luggage item, said securement strap is wrapped around said folded sections of said foldable seat and passed through said opposing pair of handles and connected together to secure said folded sections of said foldable seat in said closed position;
wherein said seat back section is capable of being supported by said handle; and,
wherein said seat bottom section is capable of being supported by said top wall;
wherein said seat bottom section and said seat back section are co-attached with a living hinge;
wherein said seat back section is divided in at least two sections, each section hingedly attached to an adjacent section;
wherein said seat back section further comprises:
a seat back first section, having a first end hingedly attached to said seat bottom section;
a seat back second section, having a first end hingedly attached to a second end of said seat back first section; and,
a seat back third section, having a first end hingedly attached to a second end of said seat back second section;

wherein:
said seat bottom section and said seat back first section are co-attached with a first living hinge;
said seat back second section and said seat back first section are co-attached with a second living hinge; and,
said seat back second section and said seat back third section are co-attached with a third living hinge.

8. The foldable seat of claim 7, wherein said seat belt assembly further comprises a two-point strap suspension system.

9. The foldable seat of claim 7, wherein said seat belt assembly further comprises a three-point strap suspension system.

10. The foldable seat of claim 7, wherein said seat belt assembly further comprises a four-point strap suspension system.

11. The foldable seat of claim 7, wherein said seat belt assembly further comprises a five-point strap suspension system.

12. The foldable seat of claim 7, wherein said securement strap system further comprises at least one strap system, each attached to a rear of said seat, and each comprising a pair of matable strap sections.

* * * * *